United States Patent [19]

Viramontes-Brown et al.

[11] Patent Number: 4,747,872
[45] Date of Patent: May 31, 1988

[54] PROCESS AND APPARATUS FOR PRODUCING HIGH PURITY IRON

[75] Inventors: Ricardo Viramontes-Brown, Garza Garcia; Jorge D. Berrun-Castanon, San Nicolas de los Garza, both of Mexico

[73] Assignee: Hylsa, S.A., Neuvo Leon, Mexico

[21] Appl. No.: 711,852

[22] Filed: Mar. 14, 1985

[30] Foreign Application Priority Data

Mar. 15, 1984 [MX] Mexico ................... 200.682

[51] Int. Cl.⁴ .................. C21B 13/04; F27D 5/00
[52] U.S. Cl. ................................. 75/37; 266/176
[58] Field of Search ............. 75/36, 0.5 BA, 37, 33; 266/176

[56] References Cited

U.S. PATENT DOCUMENTS

| | | |
|---|---|---|
| 318,606 | 5/1885 | Eames ............................. 75/36 |
| 2,386,072 | 2/1944 | Stewart . |
| 2,386,073 | 2/1944 | Stewart . |
| 2,587,113 | 2/1952 | Cavanagh . |
| 2,805,146 | 9/1957 | Howard ............................. 75/38 |
| 2,927,015 | 12/1960 | Wellman . |
| 3,894,865 | 7/1975 | Wienert ............................. 75/36 |
| 4,057,978 | 11/1977 | Sato et al. ......................... 75/33 |

FOREIGN PATENT DOCUMENTS 6029408 2/1985 Japan .
2034755 11/1980 United Kingdom .

OTHER PUBLICATIONS

"DRI-Technology and Economics of Production and Use".
Direct Reduced Iron, pub. Iron & Steel Soc. of AIME, 1980, TN707D56, pp. 74 and 75.

Primary Examiner—Melvyn J. Andrews
Attorney, Agent, or Firm—A. Thomas S. Safford

[57] ABSTRACT

Improved process and apparatus for the reduction of iron oxides employing a solid reducing agent. Particulate iron oxides are mixed with particles of the reducing agent and are subjected to high temperatures within a vessel made of refractory material which is externally heated in a furnace. The problem and drawbacks that have been found in the past, such as the fracture and high costs of the refractory vessels, are solved by means of the present invention which comprises laying a sheet made of tinplate or of other suitable material, between the vessel and solids to prevent them from sticking to the vessel because of the high temperature, thus providing an economic and advantageous process. In one of its embodiments, this process is particularly suitable for the production of high purity iron, that is with a low content of gangue and carbon. This high purity iron, once converted to powder with adequate particle size, has a number of diverse applications in industry.

17 Claims, 3 Drawing Sheets

PROCESS AND APPARATUS FOR PRODUCING HIGH PURITY IRON

FIELD OF INVENTION

The present invention relates to the reduction of iron oxides to metallic iron by means of a solid reducing agent. More particularly, in one of its embodiments, it relates to a process and apparatus for producing iron of high purity, e.g. with very low content of gangue and carbon. High purity iron has a number of applications.

BACKGROUND OF THE INVENTION

High purity iron finds a number of applications including, among others, the following:

(1) Powder Metallurgy. By means of this technique metallic parts are formed by pressing iron powder. This is particularly useful when the form of said parts poses great difficulty for their fabrication by conventional foundry and machining methods.

(2) Fabrication of welding electrodes. In this industry iron powder of controlled size and chemical composition is required as a raw material to form the electrode's skin.

(3) Fabrication of brake parts for vehicles.

(4) As chemical reagent for copper precipitation.

(5) In the pharmaceutic industry, in minor quantities.

The methods currently employed for producing high purity iron present the following disadvantages:

(a) Atomizing of pure molten iron by means of a gas jet. Although this method provides iron of adequate purity, its operation is difficult and expensive because it involves controlled melting of iron and very specialized equipment and labor for such atomizing.

(b) Electrolytic Processes. These processes are very expensive and are employed only for very special cases. The use of such processes is not economical for the massive industrial production of iron powder.

(c) Direct Reduction of iron ores by means of reducing gases (usually mixtures of hydrogen and carbon monoxide), followed by grinding to produce the desired particle size. This method has the disadvantage that iron ores contain appreciable quantities of gangue and undesired elements, such as sulfur and phosphorus which present difficulties for their elimination and interfere with some applications of the product, apart from the cost involved in producing the reducing gases.

(d) A substantial amount of the world production of high purity iron in powder form is produced through the Hoganas Process in Sweden and the United States.

In the Hoganas Process particles of iron ore concentrate are reduced with coke as reductant, and limestone is added for sulfur removal and to prevent the reduced material from sticking to the walls of a crucible or "sagger" made of ceramic material, by forming a layer of limestone or coke between the charge and the wall of the crucible.

The crucibles are taken into a furnace wherein they are subjected to high temperatures, in the range of 1000° to 1200° C. The furnace is circular. It is divided into zones where the temperature is varied by setting on and off the burners associated to each zone.

When the iron ore has been reduced, it is cooled in a non-oxidant atmosphere to avoid reoxidation of metallic iron, and then the crucibles are discharged. This iron must then be separated from the other elements: ashes from coke, limestone and others, and then it must be ground, if necessary, to the desired particle size.

This process is complicated and requires excessive handling of crucibles and materials. Furthermore, handling of crucibles causes deterioration and breakage thereof with the corresponding replacement costs.

(e) A modification to Hoganas Process is the process developed by Ontario Research Foundation, which also employs ceramic crucibles carefully filled with iron ore and coke so that coke forms a layer on the walls to prevent the reduced material from sticking thereto.

The filled crucibles are then mounted on cars moving through a tunnel furnace having heating, reducing and cooling zones, and exit already cooled at the other end of the furnace. Iron is separated and ground to the desired particle size.

This process also presents disadvantages and complications because of the moving cars through zones at very high temperatures, and the excessive handling and movement of crucibles and cars.

(f) In order to decrease the gangue and carbon content in the produced iron, the PYRON Process uses "mill scale" as raw material, instead of iron ore concentrate. Mill scale is the waste generated in rolling mills and corresponds to the oxide layer of ingots which is removed by action of the mill rolls. This "mill scale" is produced in large quantities in all lamination plants, and is mainly iron oxide free of undesired elements.

Mill scale is dried and heated to about 900° C. and then ground to particle sizes smaller than 0.15 mm. This material is then reduced with hydrogen in a continuous conveyor which passes through a furnace at a temperature of about 1000° C. The reduced product in form of sintered lumps in then ground in a ball mill to the desired size.

This process involves high operating and investment costs because it requires production of hydrogen and also uses a moving conveyor at high temperatures.

(g) It has also been proposed to reduce mill scale be means of hydrogen in a fluidized bed reactor. This type of process presents the disadvantages of requiring hydrogen and also a very strict control in order to maintain fluidization and homogeneity of the product.

BRIEF DESCRIPTION OF THE INVENTION

An object of the present invention is to provide a simple and very economic process for producing high purity iron, as well as the apparatus for carrying out said process, which overcomes the disadvantages of processes currently known. The proposed process employs a solid reducing agent, preferably graphite, in particle sizes smaller than about 2 mm. Using graphite dispenses with the high costs of producing hydrogen.

Mill scale is used as raw material, although any other source of iron oxides can be used (as for example raw iron ore or iron ore concentrate), because it is a low cost material, its recovery is attractive and it presents the advantage of having a low content of undesired elements.

Mill scale and graphite are homogeneously mixed in a proportion of about 0.130 to 0.180 kg. of graphite per one kg of mill scale for producing high purity iron (97% or more of total metallic iron, less than 0.15% of carbon and 1.5% to 2% of gangue).

This mixture is placed within a vessel of refractory material, which is always within the furnace and which is heated externally by direct fire within said furnace, in order to carry out the reduction.

A sheet of low carbon steel, sometimes referred to as "tinplate", with or without tin coating, or of any other suitable non-porous material resistant to high temperatures, is placed surrounding the mixture, between said mixture and the refractory vessel, forming a kind of cartridge, which avoids adherence of the mixture to the vessel and greatly facilitates the charging and discharging of said vessel.

Since the vessel made of refractory material and positioned within the furnace is not moved, the costs of handling and replacement thereof are reduced.

Within the furnace the temperature of the mixture is maintained between 1100° to 1300° C. during the time necessary to carry out the reduction, which is usually from 10 to 14 hours.

Once reduction is completed, the lower part of the stationary refractory vessel is opened and the iron is discharged, which has taken the form of a cylinder or a body of a sponge-like structure. This cylinder is introduced into a closed steel cooling vessel, which had been previously purged with inert gas, e.g. nitrogen and, if so desired, can be sunk in water in order to speed its cooling.

Once cool, product is extracted from the cooling vessel and is processed for its end use.

DETAILED DESCRIPTION OF THE INVENTION

Figure 1:
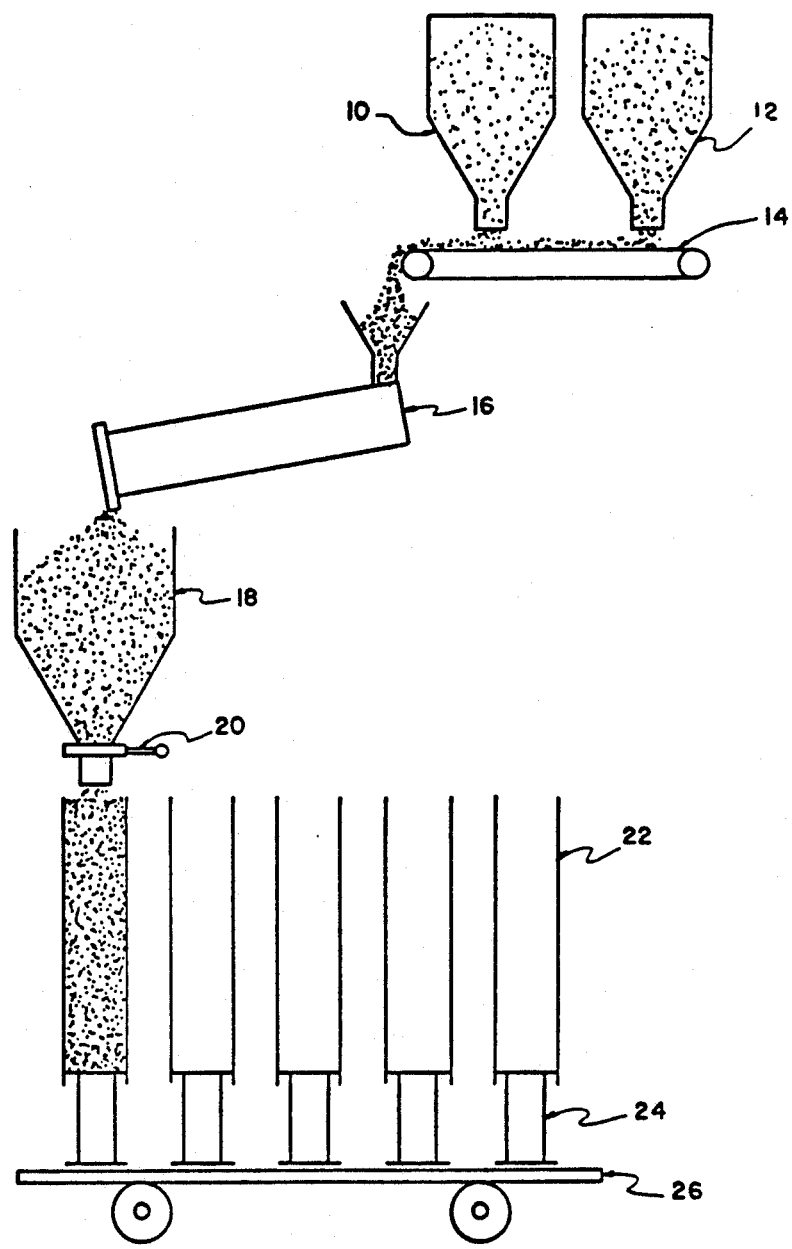
FIG. 1 is a schematic flow diagram of a preferred embodiment of the present invention, showing charging a mixture of high purity iron oxide particles plus carbon particles to cylinders mounted on a furnace car or dolly.
Figure 2:
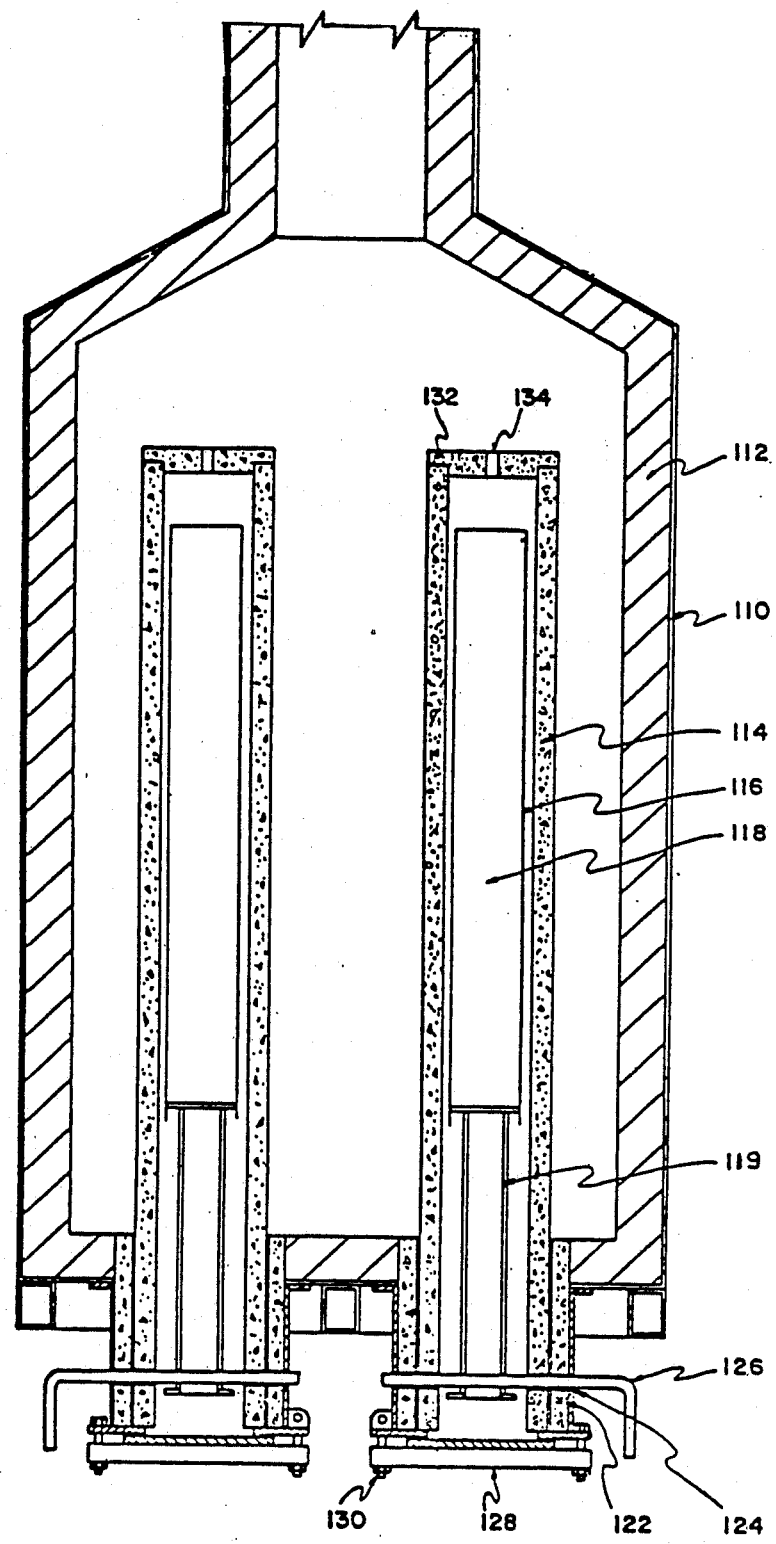
FIG. 2 is a partially schematic vertical cross-section of a furnace with charged cylinders in place for processing.

The present invention, which comprises a process for reducing iron oxides by means of a carbon-containing solid reductant, will be better understood by reference to the preferred embodiment illustrated in FIGS. 1 and 2.

FIG. 1 shows schematically the preparation of raw materials for the reduction of iron oxides. Bin 10 contains a carbon containing solid reductant, preferably graphite, which discharges in a controlled manner to a conveyor 14. Graphite is preferred to have a particle size smaller than 2 mm.

Bin 12 holds iron oxides which will be reduced to metallic iron by means of the solid reductant. It has been found particularly useful to employ "mill scale" in particle sizes smaller than 3 mm. "Mill scale" is a waste produced in rolling mills and corresponds to particles of the external surface of ingots which undergoes oxidation and which separates during the rolling of said ingots. Bin 12 discharges the mill scale in a controlled manner to a conveyor 14 which conveys it along with grahite to a mixer 16 which can be of any commercial type for mixing solids.

Once graphite and mill scale are mixed in mixer 16, they pass to a bin 18 in order to charge tinplate cylinders 22 through gate 20. Tinplate cylinders 22 are filled with a homogeneous mixture of graphite and mill scale; which containers 22 are intended to prevent said mixture from adhering to the refractory vessels when reactants are subjected to high temperatures in order to carry out the reduction.

Tinplate cylinders 22 are mounted on supports 24 which can be for example pieces of steel pipe or bars of adequate dimensions. These supports are intended to hold all the charge within the hot zone of the furnace. These cylinders 22, once charged, can be moved by means of car 26 to where the heating furnace is located as shown in FIG. 2.

FIG. 2 shows a schematic lateral view of a furnace wherein the mixture of graphite and mill scale is subjected to high temperatures, on the order of 1100° to 1300° C. Furnace 110 comprises a steel housing lined with refractory and insulating material 112, of conventional construction which is not necessary to be further described herein.

Inside the furnace there are vertical refractory vessels 114 of generally cylindrical form, within which the tinplate cylinders 116, charged with the mixture of graphite and iron oxides, are placed.

Tinplate cylinders 116 (which are essentially the same as the cylinders 22 in FIG. 1) prevent the charge 118 from sticking to the wall of the cylindrical vessels 114 when subjected to high temperatures. This permits discharging the reduced product easily, which takes the form of a cylindrical body (assuming the tinplate holders 116 are in the form of a cylinder). Supports 119 (which are essentially the same as supports 24 in FIG. 1) maintain charge 118 within the zone of high temperature and facilitate the handling thereof.

At the lower part of refractory vessels 114 there is provided a circular structure 122 which serves as support and protection to refractory vessels.

In this protection 122 and in the refractory vessels 114 there is an orifice 124 which registers with another orifice in support 119 when the charge is in its processing position. A bar 126 is introduced through these aligned orifices to keep the charge in its place. An insulated door 128 closes the lower part of refractory vessel 114, said door is joined to structure 122 by means of a hinge. This door 128 can be easily opened or closed by means of fasteners 130.

The upper part of vessel 114 is covered by cover 132 made of refractory metal, which has an orifice 134 for permitting exit of gases, mainly carbon monoxide, produced by the reduction reactions.

Figure 3:
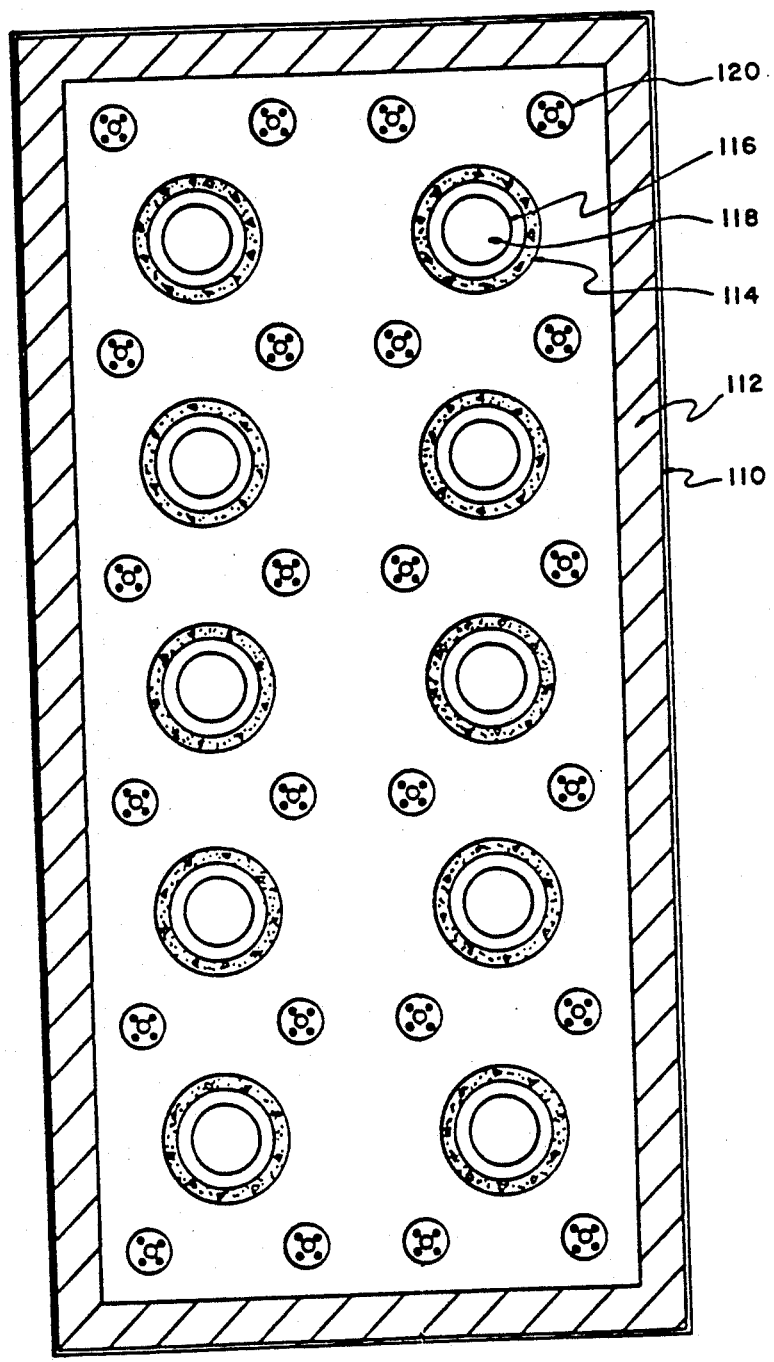
FIG. 3 is a partially schematic horizontal plan section of the furnace of FIG. 2.

As can be better seen in FIG. 3 which shows a sectional plan view of the furnace, the refractory vessels 114 are uniformly arranged inside the furnace. Burners 120 suitably distributed among the refractory vessels provide the necessary heat for carrying out the reduction of iron oxides to metallic iron. These burners maintain the temperature of the furnace in range of 1100° to 1300° C.

Reduction of iron oxides is achieved in about 10 to 14 hours. The mixture of solid reductant, for example graphite, and iron oxides, for example "mill scale", is proportioned at about 0.14 kg. of reductant per kg. of mill scale.

It is evident that although the embodiment herein described is addressed to the production of iron with a very high metallization, above 95%, and very low content of carbon, the present invention can also be used for producing iron with 1 to 3% carbon and lower metallization on the order of 85% to 95%. This product can be used as raw material for producing steel in a variety of melting and refining furnaces with great advantages.

By varying the proportions of reductant and iron oxides, a higher or lower metallization and carbon content can be obtained at the end of reduction in a controlled manner.

Although it has been described what at present is considered the preferred embodiment of this invention, it will be understood that this description is merely illustrative, and it will be apparent that numerous changes and modifications can be made without departing from the spirit and the scope of the invention.

We claim:

1. A process for producing metallic iron having a sponge-like structure from iron oxides comprising mixing particles of a carbon-containing solid reductant with particles of iron oxide, charging the mixture of said solid reductant and iron oxide to a container formed of a non-porous sheet material resistant to high temperatures, promptly placing and enclosing said charged container within a vented vessel that is made of a refractory material and which vessel is permanently mounted in a furnace, continuously externally heating said refractory vessel in said furnace to heat said mixture to a temperature above 700° C. to reduce said particles of iron oxide to metallic iron, said container operating to prevent said mixture from sticking to said refractory vessel during the heating step of the process, and thereafter removing said container and metallic iron from said furnace.

2. A process according to claim 1 wherein said solid reductant is graphite.

3. A process according to claim 1 wherein said particles of solid reductant are smaller than 2 mm.

4. A process according to claim 2 wherein said particles of solid reductant are smaller than 2 mm.

5. A process according to claim 1 wherein said sheet is made of tinplate.

6. A process according to claim 4 wherein said sheet is made of low carbon steel tinplate.

7. A process according to claim 1 wherein said iron oxides are mill scale.

8. A process according to claim 2 wherein said iron oxides are mill scale.

9. A process according to claim 6 wherein said iron oxides are mill scale.

10. A process according to claim 1 wherein said mixture is subjected to a temperature in the range of 1000° to 1300° C.

11. A process according to claim 9 wherein said mixture is subjected to a temperature in the range of 1000° to 1300° C.

12. A process according to claim 1 wherein said iron oxide particles, once reduced, are cooled in a cooling vessel before being exposed to the atmosphere.

13. A process according to claim 11 wherein said iron oxide particles, once reduced, are cooled in a cooling vessel before being exposed to the atmosphere.

14. A process according to claim 12 wherein said sponge-like iron body is cooled in an inert atmosphere within a closed steel cooling vessel which is sunk in water in order to accelerate this cooling.

15. A process according to claim 13 wherein said particles of iron oxide are cooled in an inert atmosphere within a closed steel cooling vessel which is sunk in water in order to accelerate this cooling.

16. Apparatus for producing metallic iron having a sponge-like structure from a mixture of particles of iron oxides with particles of a carbon-containing solid reductant, comprising a heating furnace having a high reducing temperature zone, at least one vessel made of refractory material fixed within said zone of said furnace for reducing iron oxides placed therein, an upper cover for said vessel with an orifice for permitting the exit of the gaseous products of reduction, a door for said vessel through with the materials to be processed are charged and withdrawn, container means for positioning through said door and for separately containing a charge of said mixture within said vessel in the high reducing temperature zone of said furnace without adhesion of said mixture to said vessel, and suitable means for carrying out fuel combustion and heating said vessel made of refractory material and its contents.

17. Apparatus according to claim 16, wherein said containing means is a vessel made from low carbon steel tinplate.

* * * * *